(12) United States Patent
Hashimura et al.

(10) Patent No.: US 8,767,282 B2
(45) Date of Patent: Jul. 1, 2014

(54) PLASMONIC IN-CELL POLARIZER

(75) Inventors: Akinori Hashimura, Vancouver, WA (US); Douglas J. Tweet, Camas, WA (US); Apostolos T. Voutsas, Portland, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 41 days.

(21) Appl. No.: 13/558,396

(22) Filed: Jul. 26, 2012

(65) Prior Publication Data

US 2012/0287362 A1 Nov. 15, 2012

Related U.S. Application Data

(63) Continuation-in-part of application No. 13/449,370, filed on Apr. 18, 2012, which is a continuation-in-part of application No. 13/434,548, filed on Mar. 29, 2012, which is a continuation-in-part of application No. 12/836,121, filed on Jul. 14, 2010, now Pat. No. 8,368,998, which is a continuation-in-part of application No. 12/646,585, filed on Dec. 23, 2009, now Pat. No. 8,223,425, which is a continuation-in-part of application No. 12/635,349, filed on Dec. 10, 2009, now Pat. No. 8,355,099, which is a continuation-in-part of application No. 12/621,567, filed on Nov. 19, 2009, now Pat. No. 8,339,543, which is a continuation-in-part of application No. 12/614,368, filed on Nov. 6, 2009, now Pat. No. 8,045,107.

(51) Int. Cl.
G02B 26/00 (2006.01)
G02B 5/30 (2006.01)
G02F 1/1335 (2006.01)

(52) U.S. Cl.
USPC .......... 359/296; 359/483.01; 359/483.03; 359/483.04; 349/84; 349/96

(58) Field of Classification Search
CPC .......... G02B 26/00; G02B 5/30; G02F 1/1335
USPC .......... 359/245, 296, 321, 350, 462, 483–485, 359/452, 492; 428/172, 195.1, 209, 402, 428/405, 470; 385/129–131, 122; 356/244, 356/445; 349/15; 216/12, 24; 250/208.1
See application file for complete search history.

(56) References Cited

U.S. PATENT DOCUMENTS 7,019,903 B2 3/2006 Berger et al.
7,456,383 B2 * 11/2008 Kim et al. .............. 250/226

(Continued)

FOREIGN PATENT DOCUMENTS

JP 2000-098323 4/2000
JP 2010-185970 8/2010

*Primary Examiner* — Loha Ben
(74) *Attorney, Agent, or Firm* — Law Office of Gerald Maliszewski; Gerald Maliszewski

(57) ABSTRACT

A plasmonic polarizer and a method for fabricating the plasmonic polarizer are provided. The method deposits alternating layers of non-metallic film and metal, forming a stack. A hard mask is formed overlying the stack. The hard mask comprises structures having dimensions and periods between adjacent structures less than a first length, where the first length is equal to (a first wavelength of light/2). The stack is etched through openings in the hard mask to form pillar stacks of alternating non-metallic and metal layers having the dimensions of the hard mask structures. Then, the hard mask structures are removed. In one aspect, subsequent to removing the hard mask structures, the spaces between the pillar stacks are filled with a dielectric material.

28 Claims, 14 Drawing Sheets

(56) References Cited

U.S. PATENT DOCUMENTS

| | | | |
|---|---|---|---|
| 7,468,148 B2 | 12/2008 | Borrelli et al. | |
| 7,622,167 B2 | 11/2009 | Hirai et al. | |
| 7,705,280 B2* | 4/2010 | Nuzzo et al. | 250/208.1 |
| 7,719,182 B2* | 5/2010 | Cok et al. | 313/506 |
| 7,889,420 B2* | 2/2011 | Gibson | 359/296 |
| 8,063,999 B2 | 11/2011 | Jabri et al. | |
| 8,130,447 B2 | 3/2012 | Miura et al. | |
| 8,134,773 B2* | 3/2012 | Miyazaki et al. | 359/315 |
| 8,254,227 B2* | 8/2012 | Engheta et al. | 369/47.35 |
| 8,358,419 B2* | 1/2013 | Walters | 356/445 |
| 8,503,064 B2* | 8/2013 | Tang et al. | 359/296 |
| 8,514,398 B2* | 8/2013 | Pang et al. | 356/445 |
| 8,547,504 B2* | 10/2013 | Guo et al. | 349/96 |
| 8,568,878 B2* | 10/2013 | Wilson et al. | 428/402 |
| 2012/0019740 A1 | 1/2012 | Kadowaki et al. | |

* cited by examiner

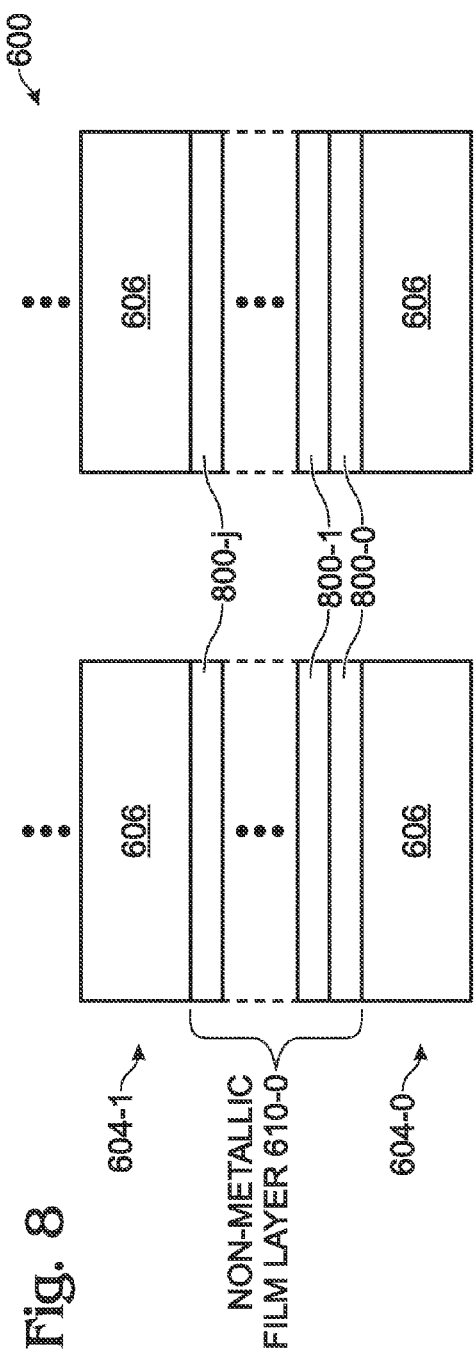
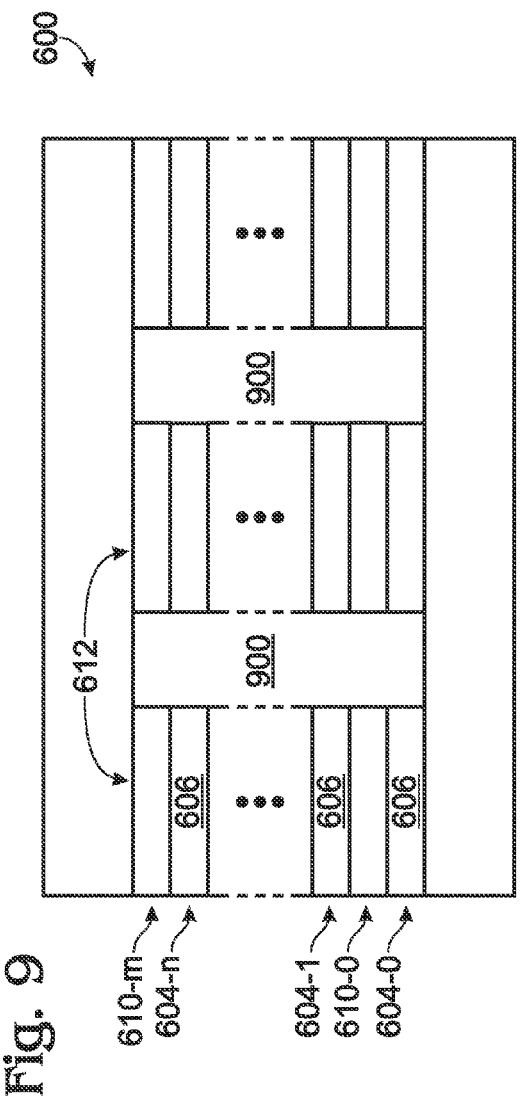

ETCH Al/SiO$_x$ STACK

DEPOSIT AND REFILL SiO$_x$

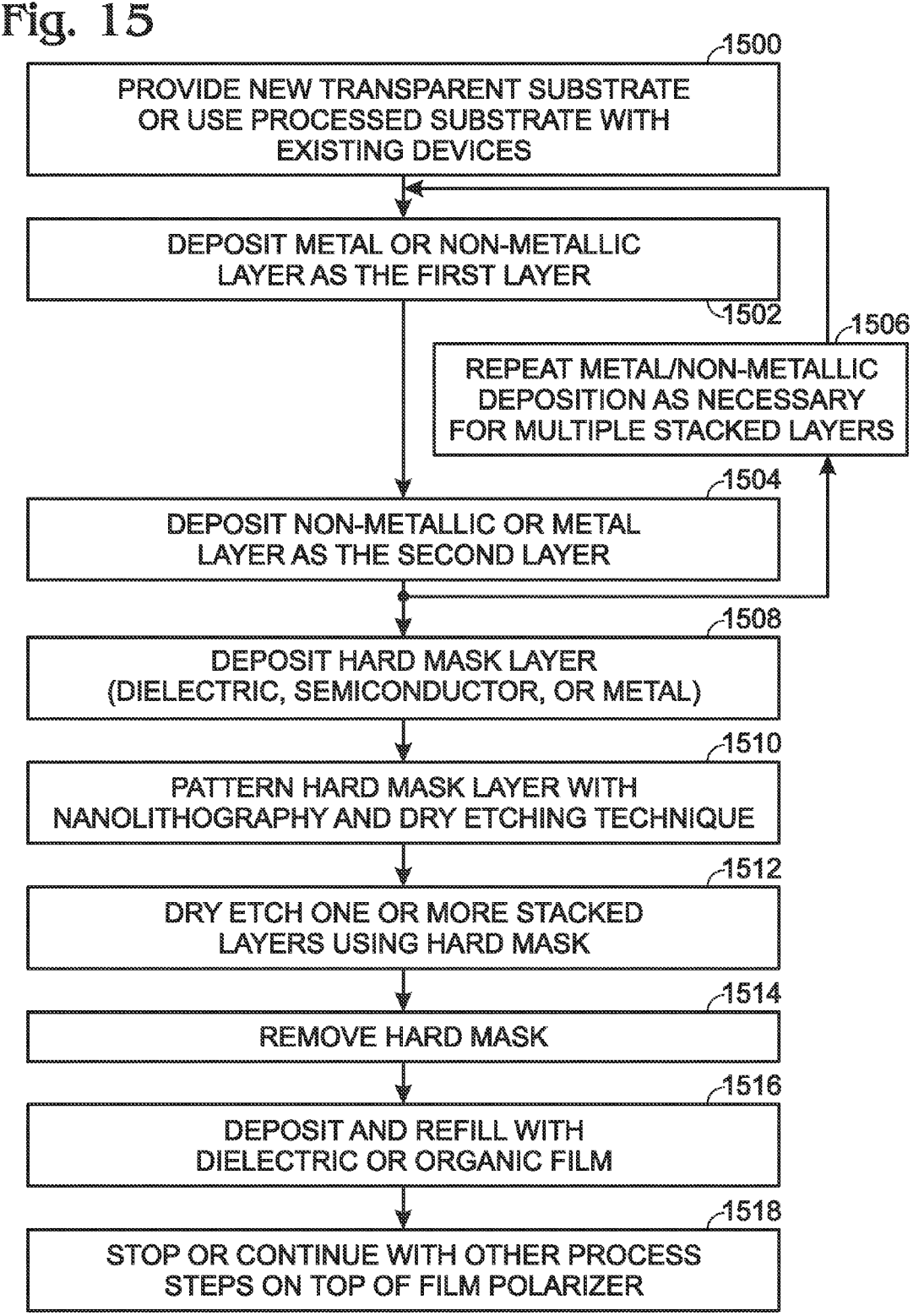

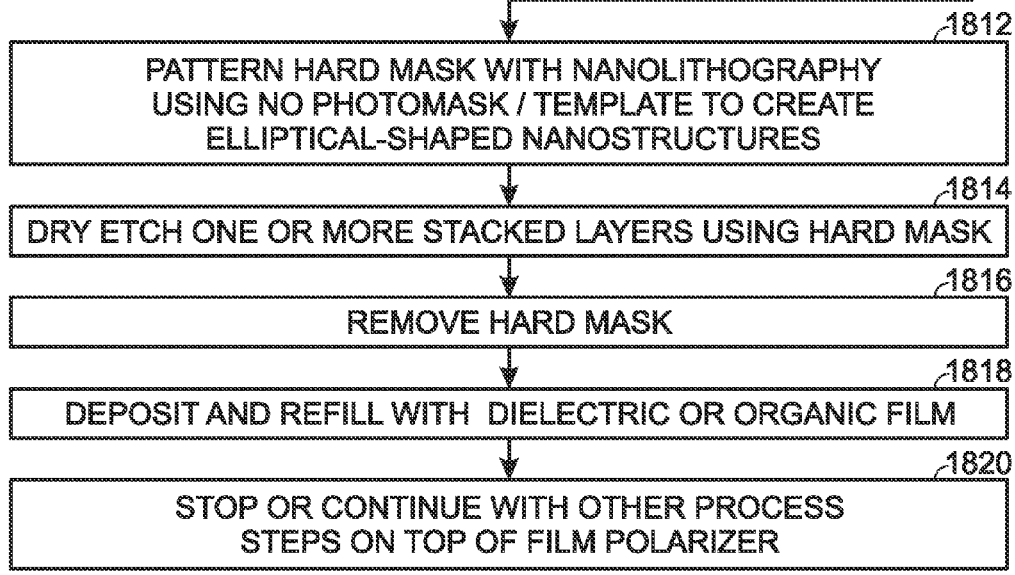
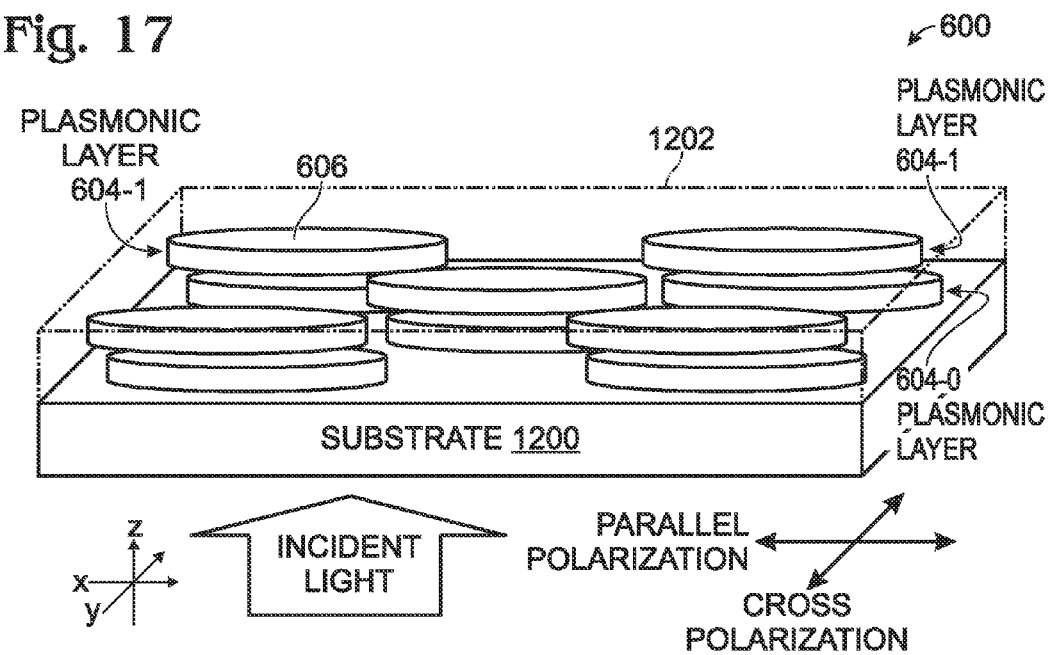

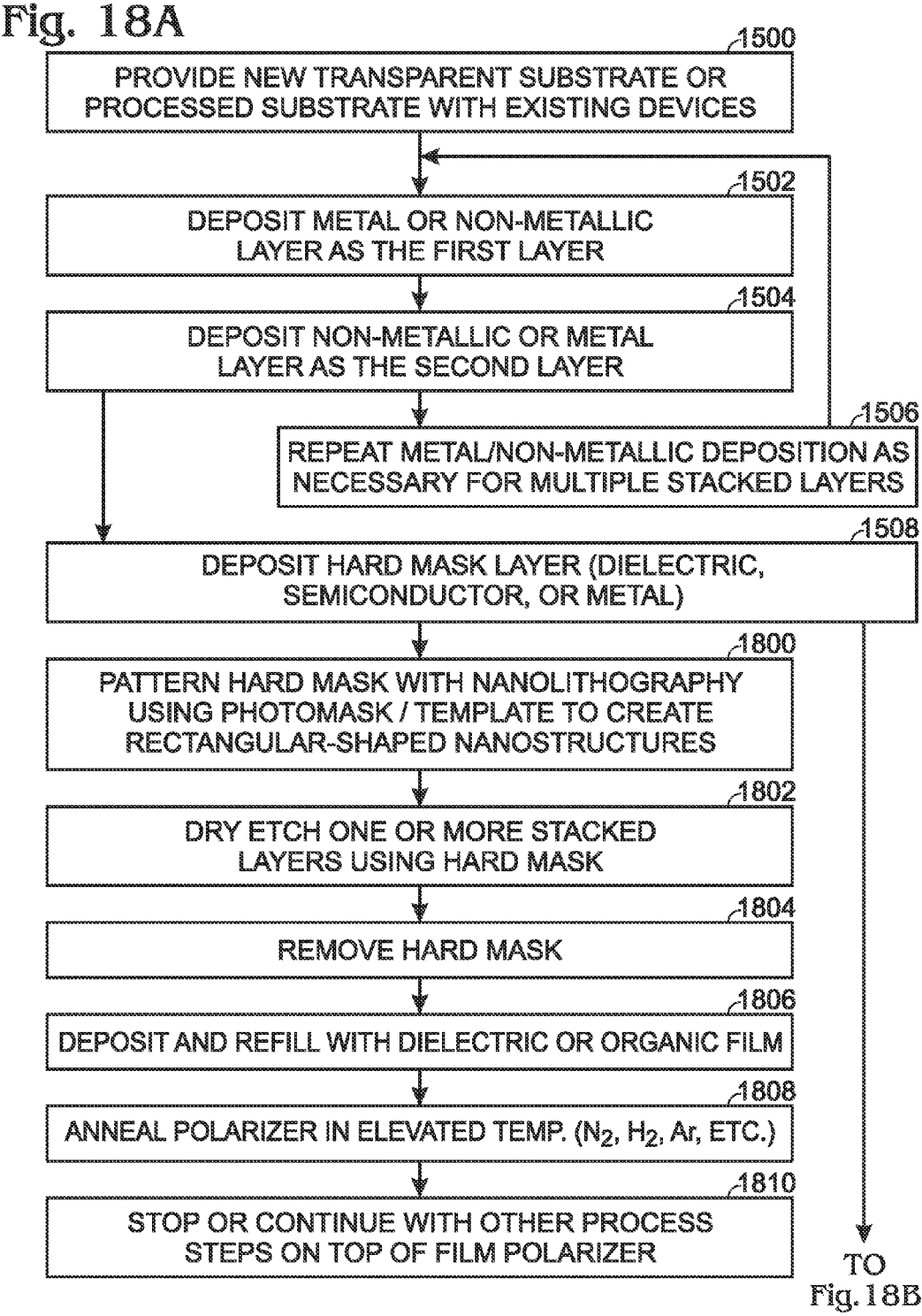

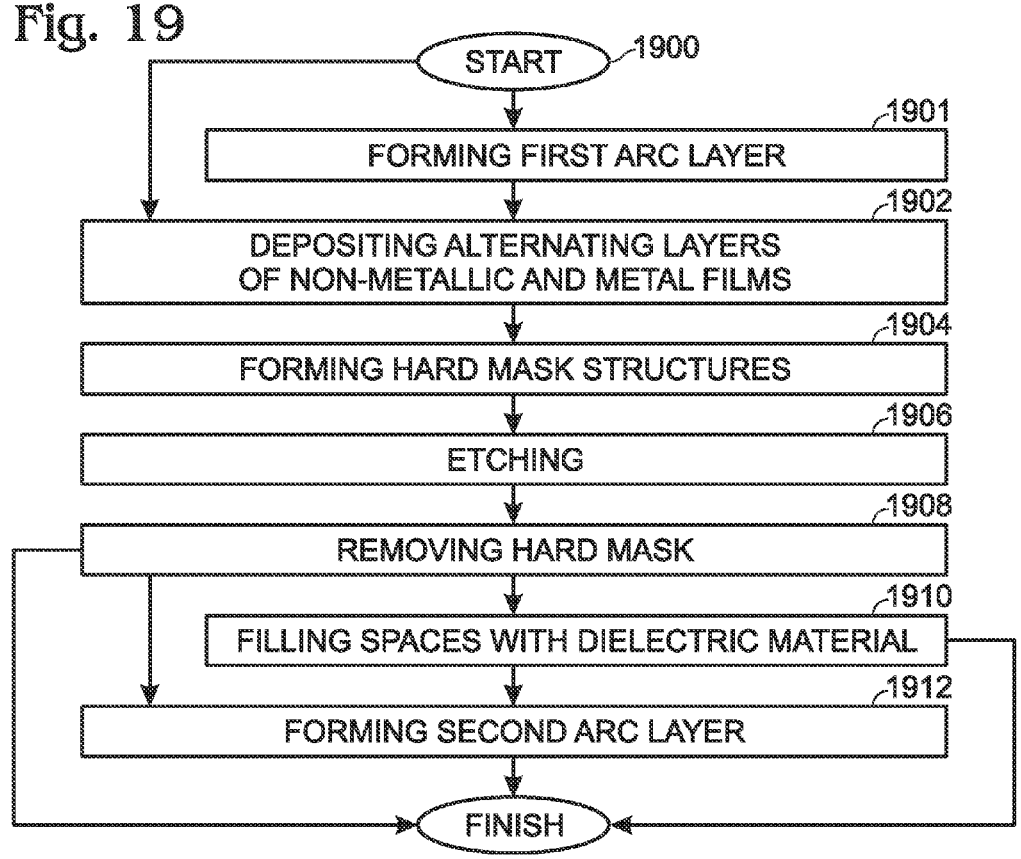

PLASMONIC IN-CELL POLARIZER

RELATED APPLICATION

The application is a Continuation-in-Part of a pending application entitled, PLASMONIC REFLECTIVE DISPLAY FABRICATED USING ANODIZED ALUMINUM OXIDE, invented by Aki Hashimura et al., Ser. No. 13/449,370, filed on Apr. 18, 2012;

which is a Continuation-in-Part of a pending application entitled, METHOD FOR IMPROVING METALLIC NANOSTRUCTURE STABILITY, invented by Aki Hashimura et al., Ser. No. 13/434,548, filed on Mar. 29, 2012;

which is a Continuation-in-Part of an application entitled, PLASMONIC ELECTRONIC SKIN, invented by Tang et al., Ser. No. 12/836,121, filed on Jul. 14, 2010, now U.S. Pat. No. 8,368,998;

which is a Continuation-in-Part of an application entitled, PLASMONIC DEVICE TUNED USING PHYSICAL MODULATION, invented by Tang et al., Ser. No. 12/646,585, filed on Dec. 23, 2009, now U.S. Pat. No. 8,223,425;

which is a Continuation-in-Part of an application entitled, PLASMONIC DEVICE TUNED USING LIQUID CRYSTAL MOLECULE DIPOLE CONTROL, invented by Tang et al., Ser. No. 12/635,349, filed on Dec. 10, 2009, now U.S. Pat. No. 8,355,099;

which is a Continuation-in-Part of an application entitled, PLASMONIC DEVICE TUNED USING ELASTIC AND REFRACTIVE MODULATION MECHANISMS, invented by Tang et al., Ser. No. 12/621,567, filed on Nov. 19, 2009, now U.S. Pat. No. 8,339,543;

which is a Continuation-in-Part of an application entitled, COLOR-TUNABLE PLASMONIC DEVICE WITH A PARTIALLY MODULATED REFRACTIVE INDEX, invented by Tang et al., Ser. No. 12/614,368, filed on Nov. 6, 2009, now U.S. Pat. No. 8,045,107. All the above-referenced applications are incorporated herein by reference.

BACKGROUND OF THE INVENTION

1. Field of the Invention

This invention, generally relates to flat panel displays and, more particularly, to plasmonic polarizer suitable for use in a flat panel display.

2. Description of the Related Art

The full range of colors produced by plasmon resonances resulting from metal nanostructures has been known since ancient times as a means of producing stained colored glass. For instance, the addition of gold nanoparticles to otherwise transparent glass produces a deep red color. The creation of a particular color is possible because the plasmon resonant frequency is generally dependent upon the size, shape, material composition of the metal nanostructure, as well as the dielectric properties of the surroundings environment. Thus, the optical absorption and scattering spectra (and therefore the color) of a metal nanostructure can be varied by altering any one or more of these characteristics. The parent applications listed above describe means of electronically controlling these color-producing characteristics.

The properties of metallic nanoparticles have drawn significant attention due to their application in photonics and electro-optics, as well as their potential application in biological/chemical sensors and renewable energy. Moreover, the fabrication of periodic metallic nanoparticle arrays for applications in photonics utilizing their localized surface plasmon resonance (LSPR) properties has been extensively studied in recent years. Among various processing techniques, depositing a film of metal on a nano-size patterned mask and using a lift-off process to remove the sacrificial layer is becoming a widely used technique, because it allows for fabricating nanoparticles with precisely controlled shape, size, and particle spacing. Moreover, advanced research has revealed that ordered array nanostructures have improved quantum characteristics utilized in LSPR properties, or photoluminescence and electroluminescence properties of semiconductor nanophosphors. Therefore, a method to achieve ordered nanoparticles and nanostructures is of significant importance.

A typical liquid crystal display (LCD) used in a laptop or cellular phone requires internal (backlight) illumination to render a color image. In polymer-networked liquid crystal (PNLC) or polymer dispersed liquid crystal (PDLC) devices, liquid crystals are dissolved or dispersed into a liquid polymer followed by solidification or curing of the polymer. During the change of the polymer from a liquid to solid, the liquid crystals become incompatible with the solid polymer and form droplets throughout the solid polymer. Typically, the liquid mix of polymer and liquid crystals is placed between two layers of glass or plastic that includes a thin layer of a transparent, conductive material followed by curing of the polymer. This structure is in effect a capacitor.

Electrodes from a power supply are attached to the transparent electrodes. With no applied voltage, the liquid crystals are randomly arranged in the droplets, resulting in scattering of light as it passes through the window assembly. This scattering results in a translucent "milky white" appearance. When a voltage is applied to the electrodes, the electric field formed between the two transparent electrodes on the glass causes the liquid crystals to align, allowing light to pass through the droplets with very little scattering and resulting in a transparent state. The degree of transparency can be controlled by the applied voltage.

FIG. 1 is a partial cross-sectional view of a liquid crystal cell assembly structure (prior art). A polarizer is a type of optical filter that selectively passes light of specific polarization in one direction and blocks waves of light in other polarizations. Polarizers are currently used in many optical systems, but among the most popular, with the largest worldwide market, is the use of polarizers in LCDs, including LCD TVs, monitors, note PCs, tablet PCs, and mobile/smart phones. For example, The bottom polarizer polarizes light from the backlight in one direction, say, the x-direction, in a horizontal plane parallel to the surfaces of the display. The top polarizer (above the color filter, in FIG. 1) is aligned perpendicular to the first polarizer, but also in the horizontal plane. It blocks light which passes through the first polarizer unless the polarization is rotated by the liquid crystal cell. Most of the linear polarizers used today in LCD applications are organic-based absorptive polarizers that are placed outside of two glass substrates that assemble a liquid crystal cell.

The absorptive film polarizer used in conventional mainstream LCD displays is made from an arrangement of iodine-doped polyvinyl alcohol (PVA) plastic that is stretched across the sheet during manufacturing to ensure that the PVA chains are aligned in one particular direction. Electrons from the iodine dopant are able to travel along the chains, ensuring that light polarized parallel to the chains is absorbed by the sheet, in contrast, light polarized perpendicular to the chains is transmitted generating a linear polarization. The liquid crystal acts as an optical switching mechanism to switch the backlight from parallel to perpendicular polarization by means of voltage actuation. However, some of the drawbacks to the conventional film polarizer are as follow: (1) a low optical efficiency with transmission values of 25~30% for unpolarized light and 50~60% for polarized light in the visible wavelength regime, with a typical extinction ratio value ($T_{per}/T_{par}$) of ~6000, (2) sensitivity to heat and humidity due to a film resin made from organic materials, and (3) limited display integration capability due to the need for a protective film such as tri-acetyl cellulose (TAC) film on both sides of polarizing layer. Specifically, thermal resistance is a significantly important issue to solve especially in projection-type liquid crystal displays where light of high energy density is introduced to both the liquid crystal and polarizer, with the latter having a function to absorb most of the unnecessary incident light.

FIG. 2 shows a schematic diagram of a glass polarizer with shape anisotropic metallic nanoparticles embedded in an optically transparent glass substrate (prior art). To overcome the problem of thermal resistance, a new type of polarizer made from glass substrates has been introduced to perform at long visible wavelengths to IR wavelengths (U.S. Pat. No. 7,019,903, U.S. Pat. No. 7,468,148, U.S. Pat. No. 8,063,999, and 2010/0019740). In these patents, the glass polarizer consists of fine metallic particles having shape anisotropy oriented and dispersed in a transparent glass substrate. Polarization is achieved from anisotropic plasmon resonances of absorption and transmission characteristics due to the embedded metallic particles.

FIG. 3 is a graph depicting the transmission characteristics of a glass polarizer made with nanoparticles having a shape anisotropy, see U.S. Pat. No. 8,063,999 (prior art). The absorption and transmission characteristics from plasmon resonances are due to correlations between the polarization plane of incident light and metallic nanoparticles having shape anisotropy. When the polarization plane is parallel to the long-axis direction of nanoparticles, the absorption peak is observed at longer wavelength (~570 nanometers (nm)) characterized by the dip in transmission spectrum shown as a solid line. On the other hand, when the polarization plane is crossed (perpendicular) to the long-axis direction of nanoparticles, the absorption peak is observed at s shorter wavelength (~390 nm) characterized by the dip in transmission spectrum as shown by the dotted line. The extinction ratio is represented as the ratio of cross transmission over the parallel transmission.

The glass polarizer tends to be more durable and stable in harsh environments, and polarizes light much better than conventional organic film polarizer, achieving extinction ratios as high as 100,000:1 for near infrared wavelength light. This type of glass polarizer is widely used as optical isolators in optical fiber communication. However, some of the drawbacks of glass polarizer are as follow: (1) a high extinction ratio is only achievable in long visible to IR wavelength due to proprietary glass manufacturing processes, and (2) a low integration capability into devices such as in LCD pixel cell due to large thickness of glass substrate.

FIG. 4 is a graph depicting transmittance as a function of wavelength (prior art). U.S. Pat. No. 8,063,999 describes a glass polarizer that operates in broadband visible and near infrared wavelengths. The cross transmission spectrum and extinction ratio of the glass polarizer are shown. These characteristics are plotted on the graph for wavelengths in the range of 400 nm to 2000 nm.

Even for the broadband glass polarizer shown in FIG. 4, there is still a sharp cut off in transmission at wavelengths below 500 nm. Moreover, the extinction ratio drops to 30 dB, which translates to only 1000:1 transmission contrast ratio at λ=500 nm. Therefore, a new type of polarizer is needed that can overcome these challenges and perform well at shorter visible wavelengths of 500 nm or below, in order to practically incorporated into display applications.

FIG. 5 shows the schematic structure of an LCD device with the polarizer placed outside of the LC substrates (prior art). In US 2010/0019740, Kadowaki et al. disclose a liquid crystal panel display that uses phosphor layers as color generating pixels that features better visual performance with wider viewing angle, as compared to conventional LCDs that use color filters and a cold-cathode fluorescent lamp (CCFL) backlight source. In FIG. 5, the two linear film polarizers (14, 15) are placed directly outside of liquid crystal cell 13, laminated onto glass substrates 11 and 12, which is the same approach used in conventional LCDs. However, in contrast to the conventional LCD, the realization of PLD device structure requires another glass substrate (not explicitly shown) that is incorporated as part of the phosphor/color filter layers 17. After manufacturing of phosphor layers onto this substrate, the phosphor substrate and liquid crystal cell are assembled together to make the display device. With this configuration, an unnecessary gap spacing is created between LC cell and phosphor layers, which causes optical cross-talk within the system, and therefore creates low contrast and poor visual performances in the display. Also, the manufacturing costs would be significantly high due to the complex 3-glass substrate structure.

It would be advantageous if a polarizer could be fabricated with a thickness less than 10 microns.

It would be advantageous if a polarizer could be fabricated using inorganic materials, for enhanced reliability.

It would be advantageous if a polarizer could be fabricated with a large extinction ratio at wavelengths of 500 nm and below.

SUMMARY OF THE INVENTION

Described herein is an in-cell polarizer that can achieve high polarization performance at all the visible wavelengths including blue wavelength range (400-500 nm). Moreover, the polarizer can be easily integrated into a liquid crystal cell structure to realize a new type of LCD display with a better visual performance and lower power consumption, as compared to conventional LCD systems. For example, a polarizer operating in blue wavelength range would be useful for an LCD display with blue light emitting diode (LED) backlight that has color generating pixels that include red and green fluorescent layers, and a blue transmission layer.

Accordingly, a method is provided for fabricating a plasmonic polarizer. The method deposits alternating layers of non-metallic film and metal, forming a stack. A hard mask is formed overlying the stack. The hard mask comprises structures having dimensions and periods between adjacent structures less than a first length, where the first length is equal to (a first wavelength of light/2). The stack is etched through openings in the hard mask to form pillar stacks of alternating non-metallic and metal layers having the dimensions of the hard mask structures. Then, the hard mask structures are removed. In one aspect, subsequent to removing the hard mask structures, the spaces between the pillar stacks are filled with a dielectric material.

The non-metallic films have a thickness ($SP_L$) less than the first length, and the metal films have a thickness (t) less than the first length. The thicknesses ($SP_L$) of the non-metallic film layers may be uniform or non-uniform. Likewise, the thickness (t) of the metal layers may be uniform or non-uniform.

The hard mask structures may all have common dimensions, or uncommon dimensions. The periods between hard mask structures comprise a first space ($S_a$) in a first direction and a second space ($S_b$) in a second direction, orthogonal to the first direction. The first spaces may be a uniform or non-uniform value. Likewise, the second spaces may be a uniform or non-uniform value. In addition, the hard mask structures have a length ($D_a$) in a first direction and a width ($D_b$) in a second direction, orthogonal to the first direction, wherein $D_a$ is greater than $D_b$.

Additional details of the above-described method, a plasmonic polarizer device, and a display using an in-cell plasmonic polarizer are presented below.

BRIEF DESCRIPTION OF THE DRAWINGS

FIG. 8 is a partial cross-sectional view of a non-metallic film detail of the plasmonic polarizer.

FIG. 9 is a partial cross-sectional view depicting a variation of the plasmonic polarizer of FIG. 6A.

FIG. 15 is a flowchart presented in association with the fabrication steps of FIGS. 14A through 14I.

FIG. 17 is a perspective view of a plasmonic polarizer with elliptical-shaped metal nanostructures arranged randomly in-plane and out-of-plane.

FIGS. 18A and 18B are flowcharts illustrating two different manufacturing methods to realize elliptical-shaped nanostructures, using the flowchart of FIG. 15 as a foundation.

FIG. 19 is a flowchart illustrating a method for fabricating a plasmonic polarizer.

DETAILED DESCRIPTION

Figure 6B:
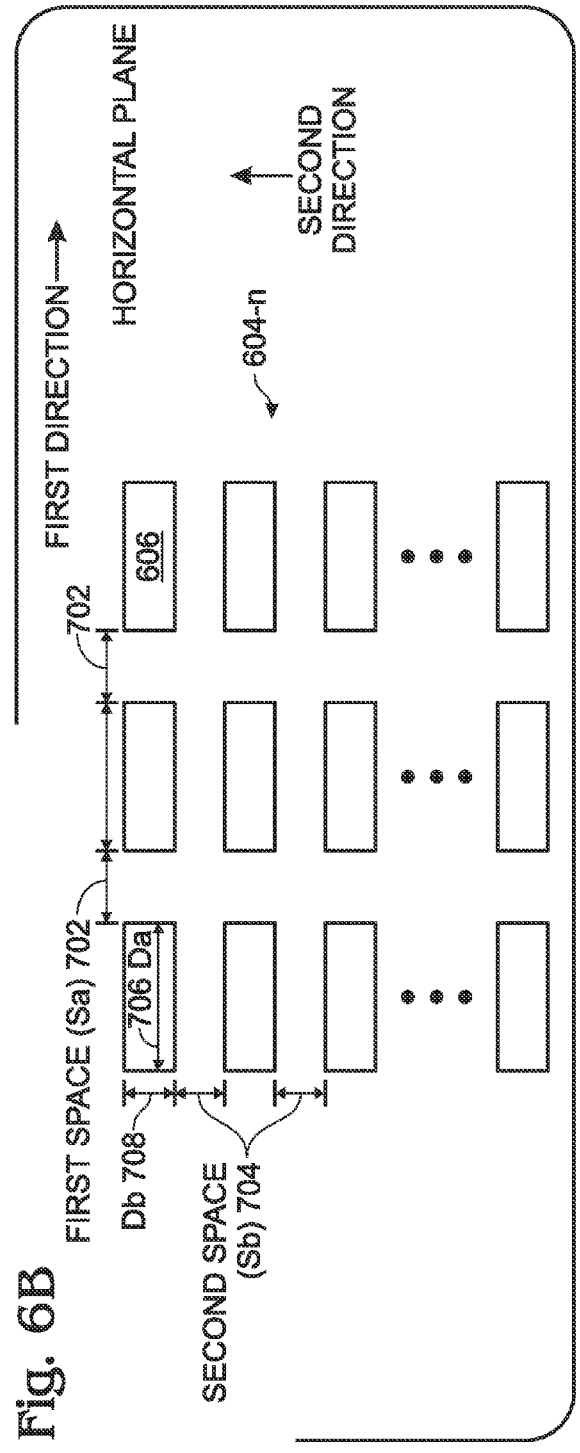
FIGS. 6A and 6B are, respectively, partial cross-sectional and plan views of a plasmonic polarizer.
Figure 6A:
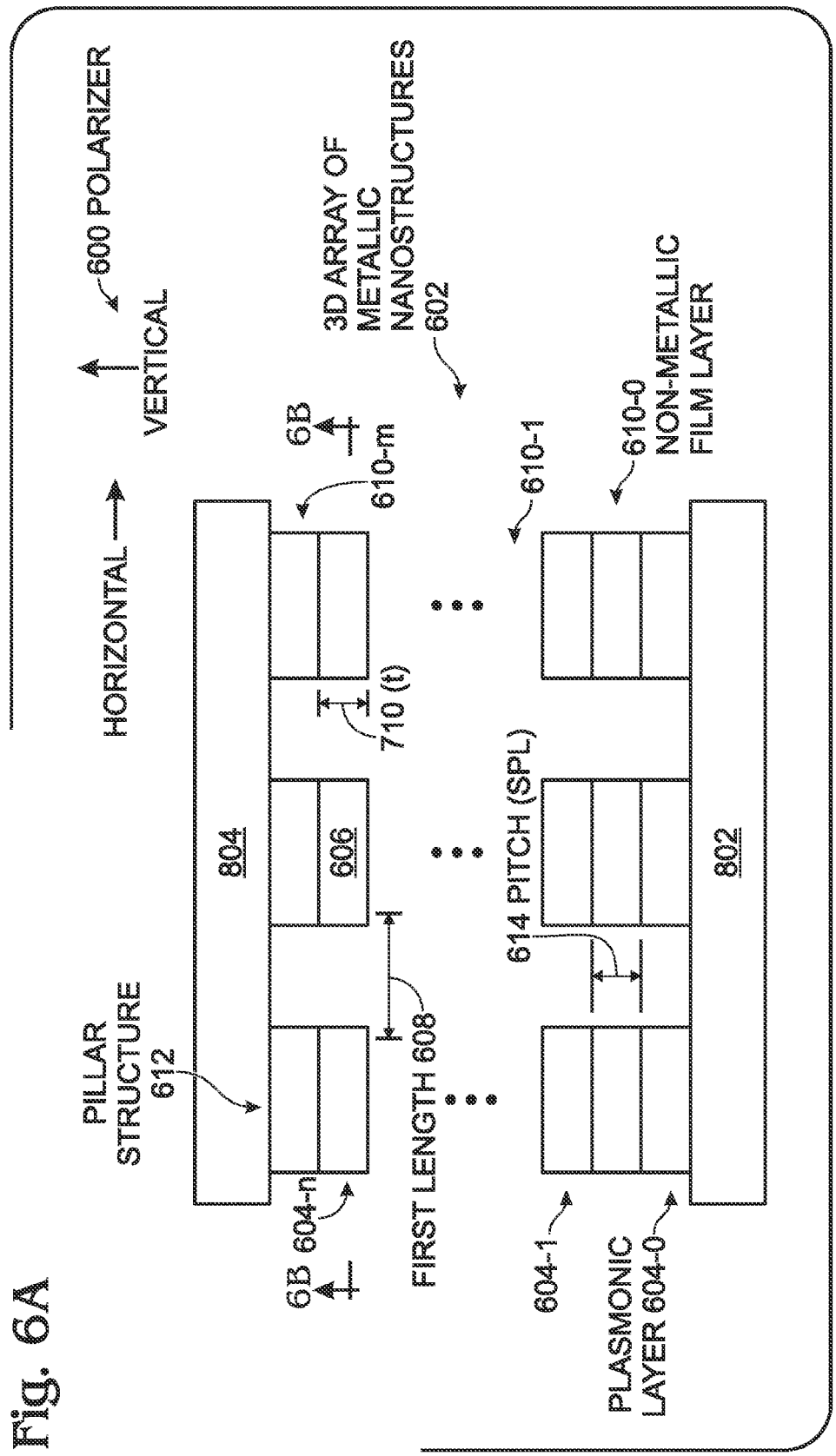

FIGS. 6A and 6B are, respectively, partial cross-sectional and plan views of a plasmonic polarizer. The polarizer 600 comprises a three-dimensional (3D) array of metallic nanostructures 602 comprising a plurality of plasmonic layers 604-0 through 604-$n$, where each layer includes a pattern of metallic nanostructures 606. The nanostructures 606 have dimensions and periods between adjacent nanostructures less than a first length 608, where the first length is equal to (a first wavelength of light/2). For example, the first wavelength of light may be 450 nm. The 3D array of metallic nanostructures 602 also comprises a plurality of non-metallic film layers 610-0 through 610-$m$, with at least one non-metallic film layer interposed between adjacent plasmonic layers. The values of (n) and (m) are positive integer variables not limited to any particular value. The value of (m) need not necessarily equal the value of (n). Each non-metallic film layer may be comprised of a material transparent in a first range of light wavelengths, or a material absorptive in the first range of light wavelengths. As described in more detail below, each non-metallic film layer may be comprised of multiple film layers, which may be transparent, absorptive, or include both kinds of film materials.

As shown in FIG. 6A, vertically adjacent nanostructures 606, in adjacent plasmonic layers, form pillar structures 612. The vertically adjacent nanostructures 606 in the pillar structures 612 have a pitch ($SP_L$) 614 less than the first length. As shown, the pitch 614 is uniform, but in other aspects it may be non-uniform. Alternately stated, the thicknesses of the non-metallic film layers may either be uniform, or they may vary. As shown in FIGS. 6A and 6B, the nanostructures 606 all have common dimensions.

Figure 7:
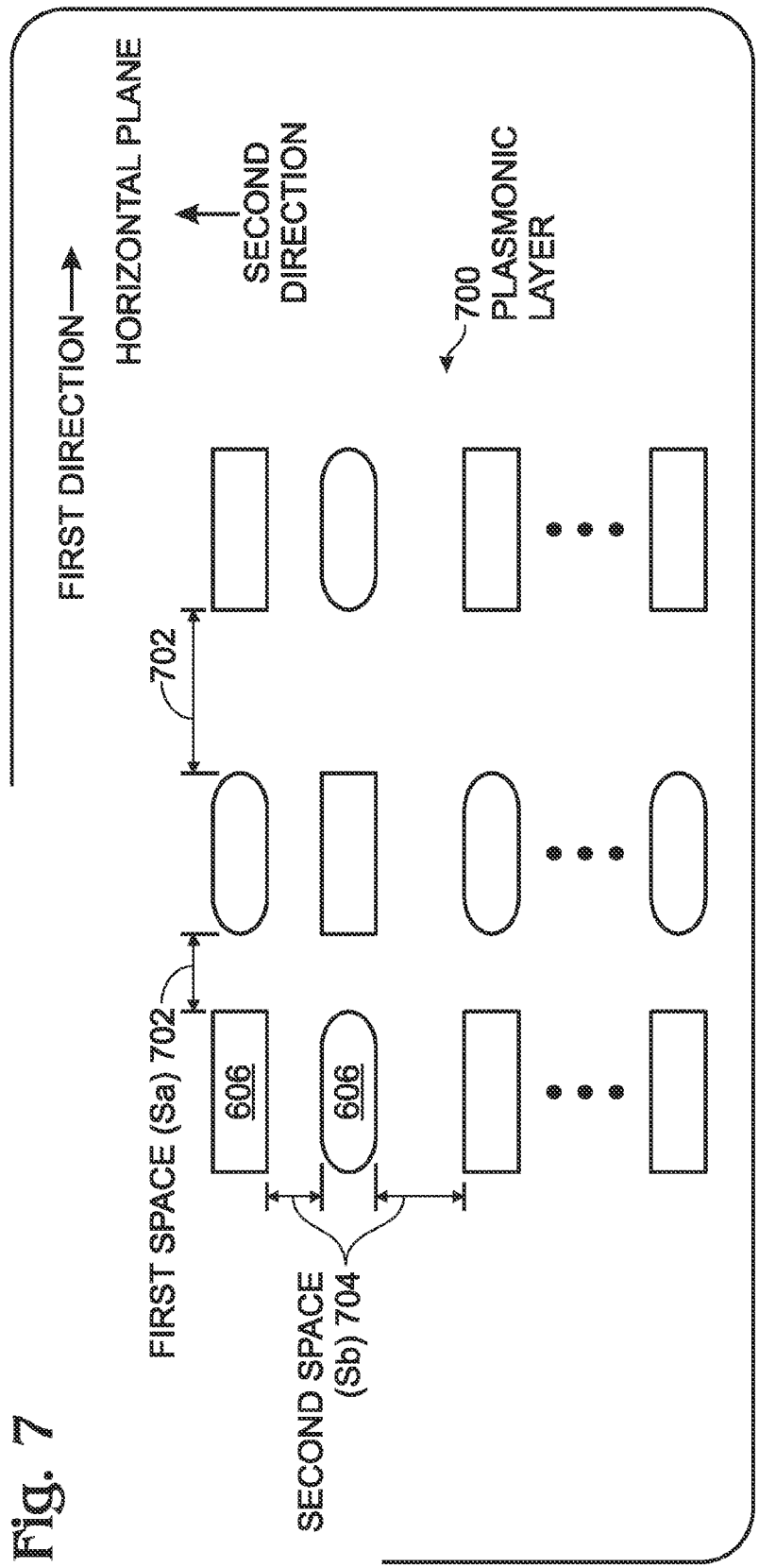
FIG. 7 is a plan view of a plasmonic polarizer where the nanostructures in each plasmonic layer pattern have uncommon dimensions.

FIG. 7 is a plan view of a plasmonic polarizer where the nanostructures in each plasmonic layer pattern have uncommon dimensions. Here, the nanostructures in one plasmonic layer 700 are shown. By "uncommon dimensions" it is meant that the nanostructures may be different dimensions, but the differences are formed in a periodic pattern. Alternatively but not shown, the nanostructure dimensions may be random or non-periodic.

The periods between nanostructures 606 in each plasmonic layer comprise a first space ($S_a$) 702 in a first direction in a horizontal plane and a second space ($S_b$) in a second direction in the horizontal plane, orthogonal to the first direction. The first spaces have non-uniform values and the second spaces have non-uniform values.

Alternatively, see FIG. 6B, the periods between nanostructures in each plasmonic layer comprise a first space ($S_a$) in a first direction in a horizontal plane and a second space ($S_b$) in a second direction in the horizontal plane, orthogonal to the first direction. The first spaces are a first uniform value and the second spaces are a second uniform value.

The nanostructures 606 have a length ($D_a$) 706 in a first direction in a horizontal plane, a width ($D_b$) 708 in a second direction in the horizontal plane, orthogonal to the first direction, and a thickness (t) 710 in a vertical plane orthogonal to the horizontal plane (see FIG. 6A), wherein $D_a$ is greater than $D_b$, and wherein $D_a$ is greater than t.

FIG. 8 is a partial cross-sectional view of a non-metallic film detail of the plasmonic polarizer. Each non-metallic film layer, layer 610-0 is shown, may comprise a first plurality of overlying non-metallic films 800-0 through 800-$j$, comprised of a corresponding first plurality of non-metallic film materials. The value of (j) is a positive integer not limited to any particular value. Each film 800 in the non-metallic film layer 610-0 may be a unique material, the same material, or a set of materials interleaved in a periodic pattern. It should also be understood that the other non-metallic film layer in the polarizer 600, e.g., layers 610-1 and 610-$m$, may be same as layer 610-0, composed of a single film layer, or composed a films that made from different materials that layer 610-0, or organized in a different pattern.

Returning to FIG. 6A, in one aspect, the polarizer 600 further comprises a first antireflective coating (ARC) film 802 underlying the 3D array of nanostructures 602. A second ARC film 804 may overlie the 3D array of nanostructures 602. The ARC film may be comprised of multiple film layers, as is well known in the art.

FIG. 9 is a partial cross-sectional view depicting a variation of the plasmonic polarizer of FIG. 6A. The space between pillar structures 612 in FIG. 6A may be filled with an ambient atmosphere or gas. Alternatively, as shown in FIG. 9, a dielectric material 900 fills spaces in the 3D array of metallic nanostructures between pillars 612 of vertically adjacent nanostructures. In another aspect not shown, the dielectric 900 may only partially fill the spaces between pillar structures, or there may be multiple layers of fill material having different characteristics.

Figure 10:
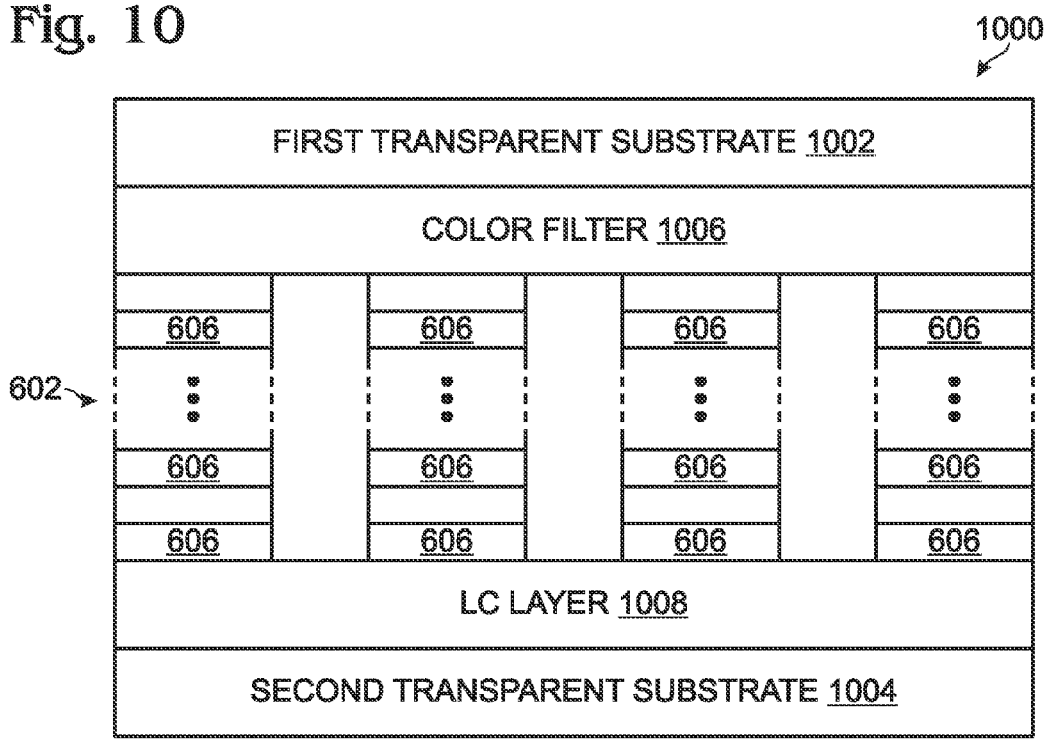
FIG. 10 is a partial cross-sectional view of a liquid crystal display (LCD) front plane with an in-cell polarizer.

FIG. 10 is a partial cross-sectional view of a liquid crystal display (LCD) front plane with an in-cell polarizer. In addition to the plasmonic polarizer 600 described above in FIGS. 6A through 9, which functions as an in-cell polarizer, the LCD 1000 further comprises a first transparent substrate 1002 overlying the 3D array of metallic nanostructures 602. A second transparent substrate 1004 underlies the 3D array of metallic nanostructures 602. The transparent substrates may be glass or quartz, for example. The in-cell polarizer 1000 may also comprise a display control mechanism, such as a liquid crystal (LC) layer or a color filter interposed between a transparent substrate and the 3D array of metallic nanostructures. As shown, both control mechanism may be present, with the color filter 1006 interposed between the first substrate 1002 and the 3D array of metallic nanostructures 602, and the LC layer 1008 interposed between the second substrate 1004 and the 3D array of metallic nanostructures 602. However, other layer arrangements are possible.

Figure 11:
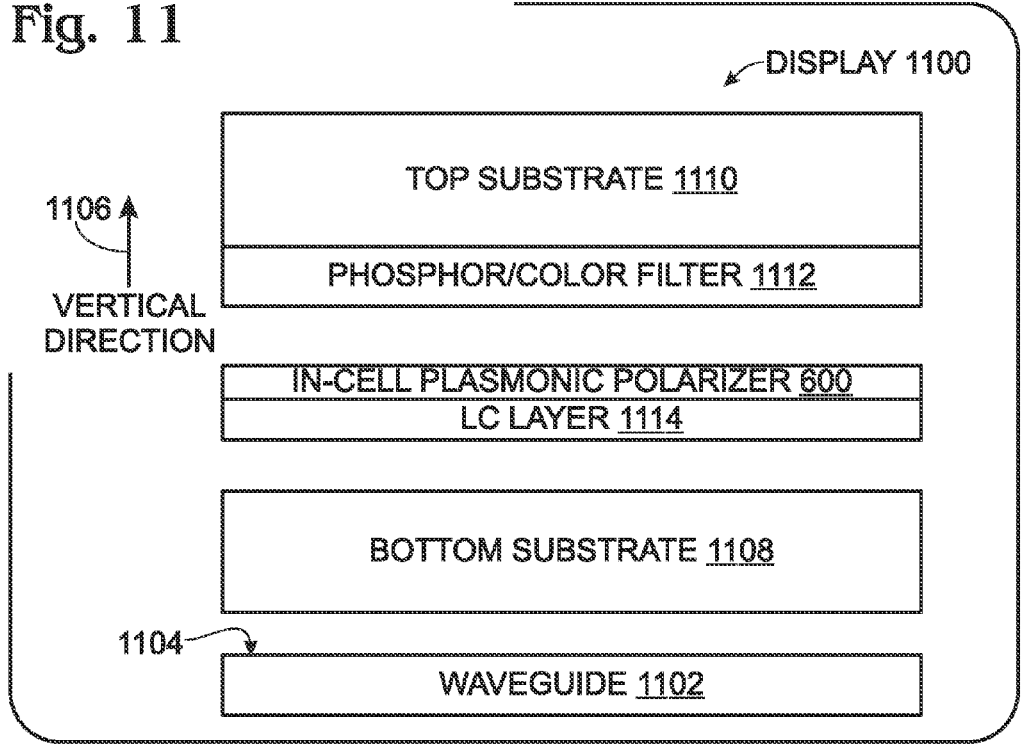
FIG. 11 is a partial cross-sectional view of a display with a plasmonic polarizer in the front plane and a waveguide in the backplane.

FIG. 11 is a partial cross-sectional view of a display with a plasmonic in-cell polarizer in the front plane and a waveguide in the backplane. The display 1100 comprises a waveguide 1102 having a horizontal top surface 1104 to supply visible spectrum light in a vertical direction 1106, orthogonal to the horizontal top surface. A transparent bottom substrate 1108 overlies the waveguide 1102. A plasmonic in-cell polarizer 600 overlies the waveguide top surface 1104. The polarizer 600 comprises a 3D array of metallic nanostructures overlying the bottom substrate 1108. The composition of the 3D array of metallic nanostructures has been described in detail above, and a summary of the polarizer is presented in the interest of brevity. Referring briefly to FIG. 6A, the 3D array 602 comprises a plurality of plasmonic layers 604-0 through 604-$n$, where each layer includes a pattern of metallic nanostructures 606. The nanostructures 600 have dimensions and periods between adjacent nanostructures less than a first length, where the first length is equal to (a first wavelength of light/2). The 3D array 602 also comprises a plurality of nonmetallic film layers 610-0 through 610-$m$, with at least one non-metallic film layer interposed between adjacent plasmonic layers.

A transparent top substrate 1110 overlies the 3D array of metallic nanostructures 602. A color filter 1112 interposed between the top substrate 1110 and the 3D array of metallic nanostructures 602. In one aspect, the color filter 1112 is a phosphor color filter, and the waveguide 1102 supplies light at a wavelength of about 450 nanometers. For example, blue spectrum light emitting devices (LEDs) may be used as the waveguide light source. Then, the color filter would be comprised of pixels with red and green fluorescent layers, and a blue transmission layer.

In one aspect, as shown, an LC layer 1114 is interposed between the bottom substrate 1108 and the polarizer 600. In this aspect, the bottom substrate 1108 can be an active matrix of thin-film transistors (TFTs). As is well known in the art, these switching transistors create selectively engagable regions of the LC layer, referred to as pixels, to either permit or block the passage of light.

Some examples of metallic nanostructure materials include Al, Au, Ag, Cu, Pt, or alloys of the above-mentioned metals. Some examples of dielectric materials include $SiO_x$, $SiN_x$, $SiO_xN_y$, $MgF_2$, $CaF_2$, SiOC, Teflon® AF, or organic polymers.

Figure 1:
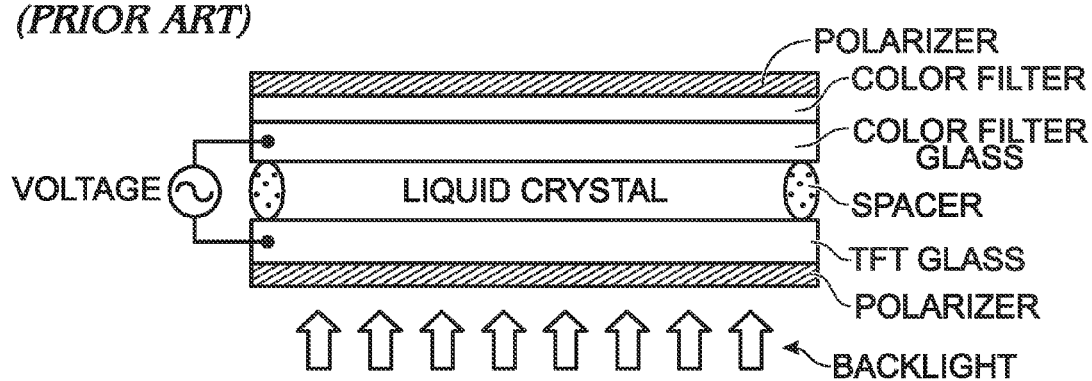
FIG. 1 is a partial cross-sectional view of a liquid crystal cell assembly structure (prior art).
Figure 2:
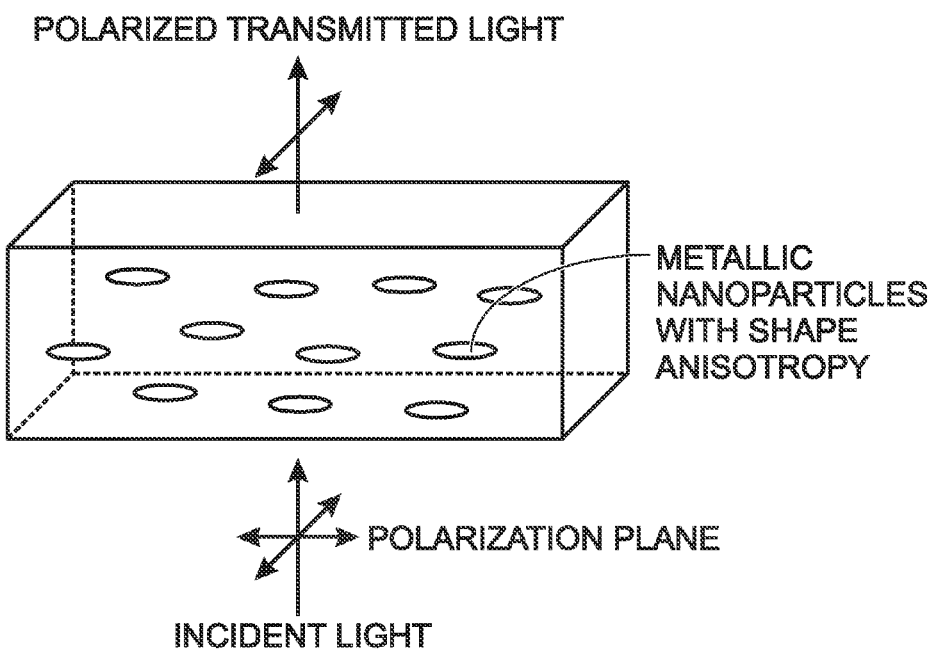
FIG. 2 shows a schematic diagram of a glass polarizer with shape anisotropic metallic nanoparticles embedded in an optically transparent glass substrate (prior art).
Figure 3:
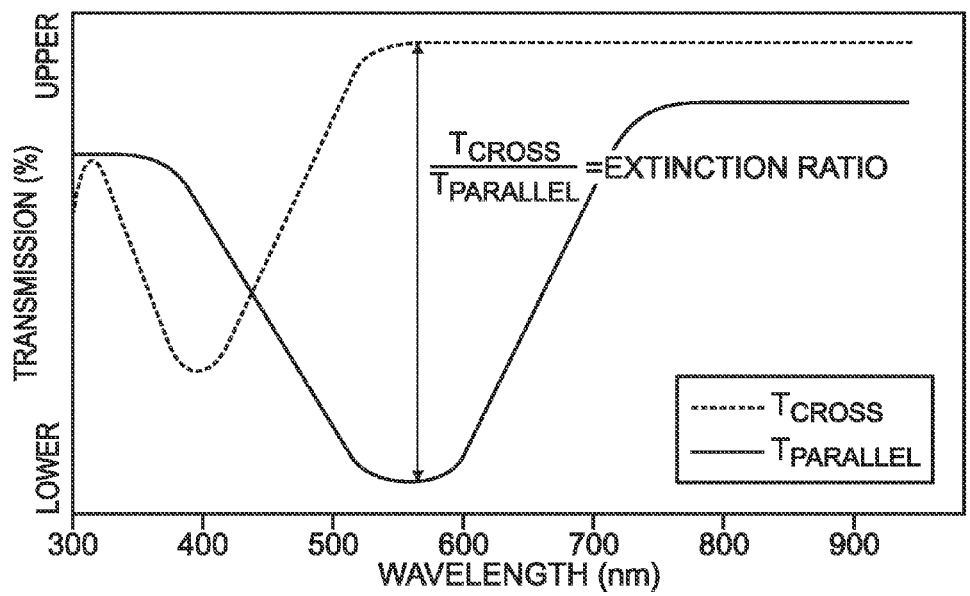
FIG. 3 is a graph depicting the transmission characteristics of a glass polarizer made with metal nanoparticles having a shape anisotropy, see U.S. Pat. No. 8,063,999 (prior art).
Figure 4:
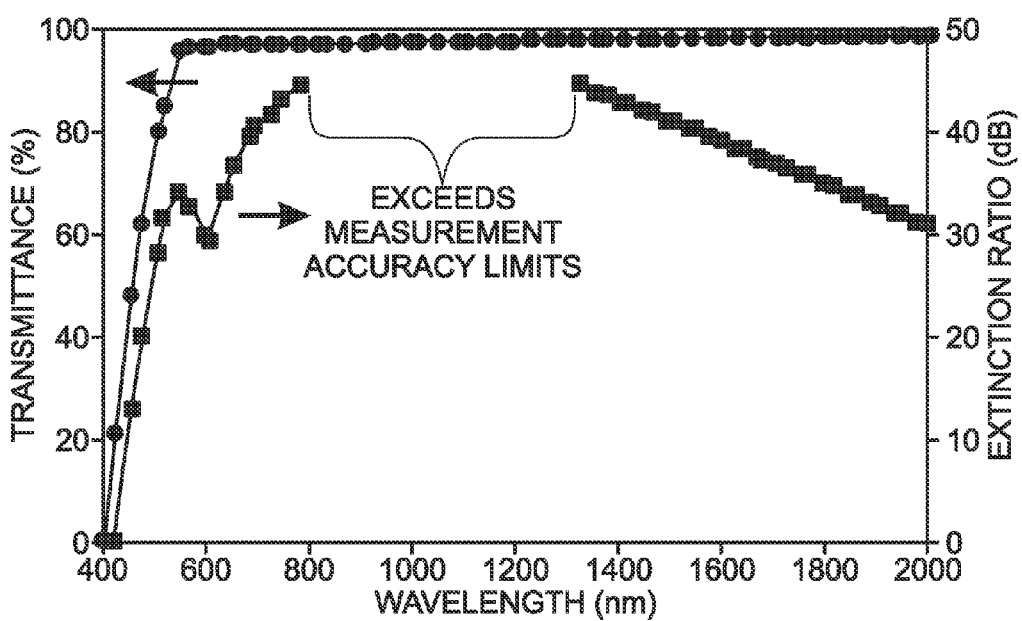
FIG. 4 is a graph depicting transmittance as a function of wavelength (prior art).
Figure 5:
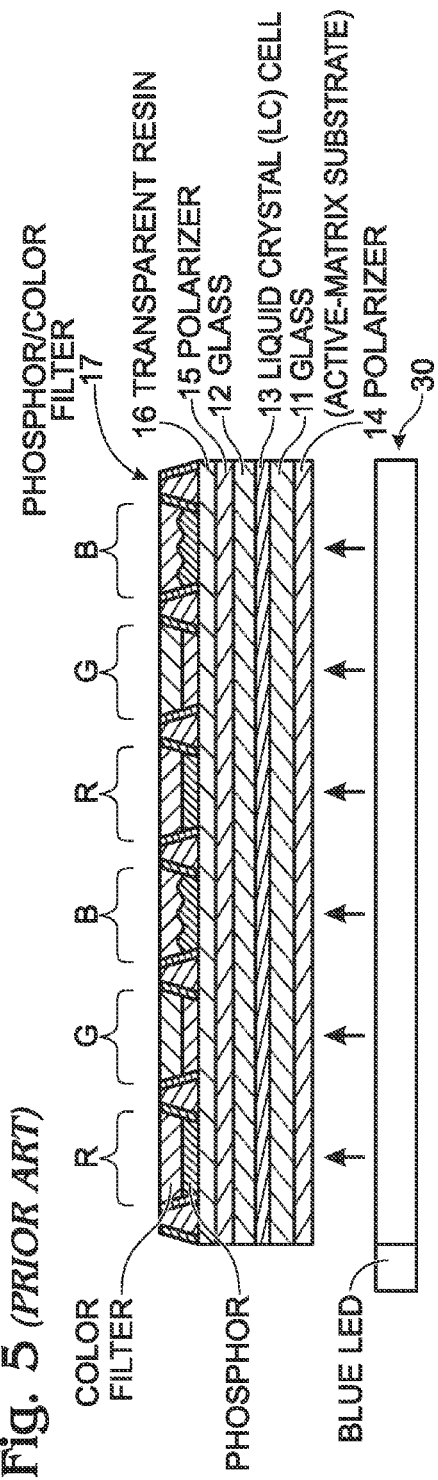
FIG. 5 shows the schematic structure of an LCD device with the polarizer placed outside of the LC substrates (prior art).

To mitigate the problems arising from display device shown in FIG. 5, in-cell polarizer 600 can be integrated directly on top of the LC layer or LC cell 1114. The in-cell polarizer is a high performance plasmonic film polarizer that can operate in all the visible and near UV wavelengths. Moreover, the polarizer is much thinner than conventional organic film polarizers. The thickness of the in-cell polarizer 600 can range from less than 500 nm to 10 microns (μm), which is at least an order of magnitude smaller than any conventional linear polarizer. Moreover, the performance of the polarizer is excellent, with extinction ratio greater than 15,000 at blue wavelengths (400-500 nm). The in-cell polarizer has competitive advantages over conventional polarizers in terms of performance, thickness, integration capability, and reliability.

Figure 12:
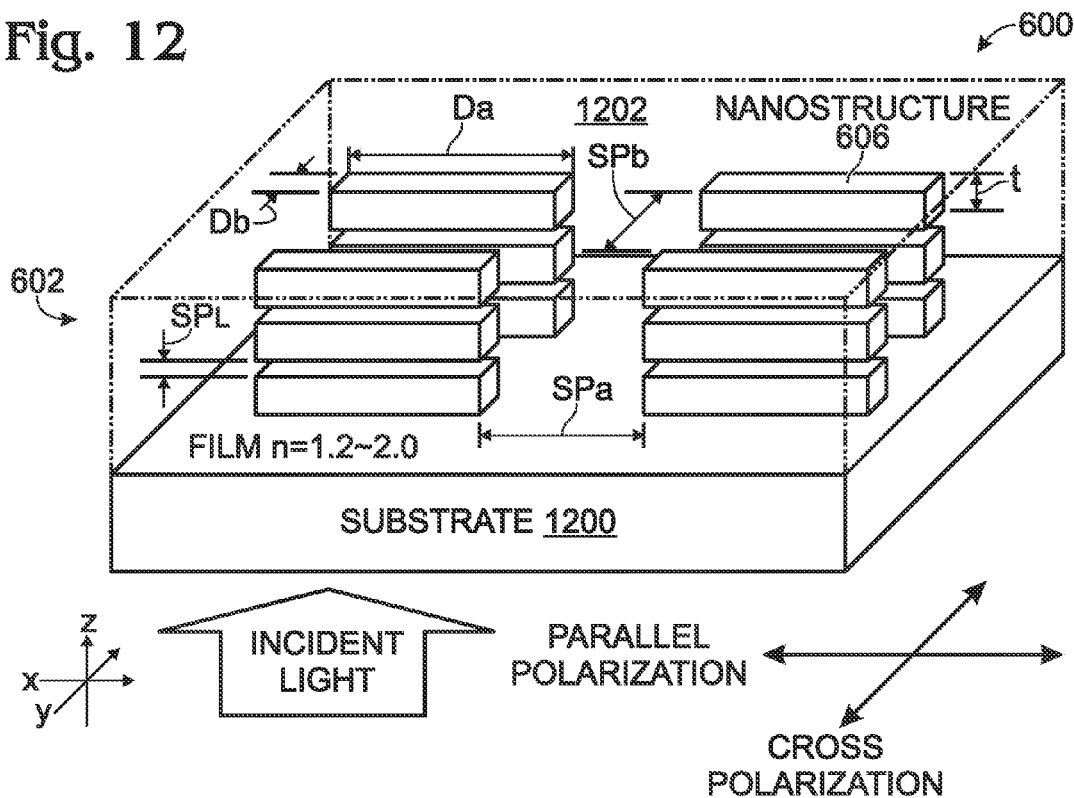
FIG. 12 is a detailed schematic representation of a plasmonic film polarizer shown in a perspective view.

FIG. 12 is a detailed schematic representation of a plasmonic film polarizer shown in a perspective view. The rectangular nanostructures 606 may be aluminum nanoparticles that are arranged in array configuration with x-direction spacing ($SP_a$) and y-direction spacing ($SP_b$). $D_a$ indicates the long-axis dimension of nanoparticle, $D_b$ indicates the short-axis dimension, and t refers to thickness of each nanoparticle. Series of multiple array nanostructures are stacked together on top of each layer with layer gap spacing ($SP_L$). The nanostructures are arranged on top of transparent substrate 1200 such as glass or quartz, or a low dielectric constant material with a refractive index of between 1.2 and 2, for example. The composite nanostructures are embedded in dielectric or organic film structure 1202 with predefined refractive index. For example, the index of refraction may be in the range of 1.2 to 2. By properly designing the dimensions of nanostructure, the spacing of nanostructures, layer gap spacing, and film refractive indexes, localized surface plasmon resonance (LSPR) effects can be exploited to enhance the performance of polarizer. The polarizer uses the coupling effects of plasmonic resonances not only in the plane (x-y axes) of substrate but also in the out-of-plane (z-axis) directions.

The design of plasmonic film polarizer is based on the enhancement of LSPRs, which are collective electron charge oscillations within metallic nanostructures that are excited by incident light. LSPR has very high spatial resolution in sub-wavelength regime, so light intensity enhancement is limited mostly by the size of nanostructures. Each of the nanostructures exhibits enhancement of the electromagnetic field amplitude at the surface resonance wavelength. This field is highly localized at the nanostructures, and decays rapidly away from the nanostructure/dielectric interface into the dielectric background, usually within the range of 20~30 nm. However, the far-field scattering by each particle is also enhanced by the resonance. By having metal nanostructures in series and in parallel configuration for both in-plane and out-of-plane as shown, polarizer performances can be maximized with both near-field and far-field amplitude enhancements.

Figure 13A:
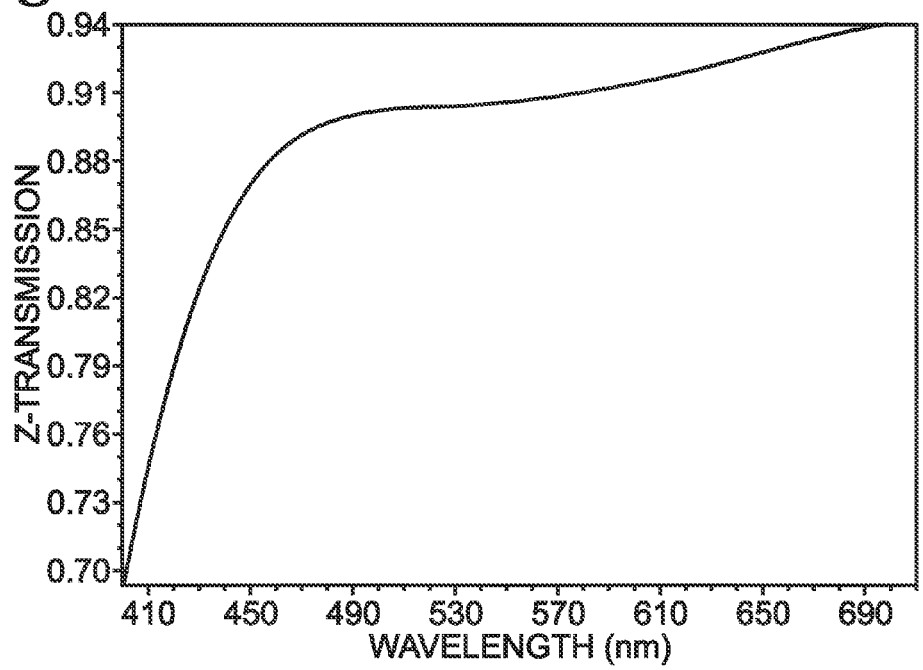
FIGS. 13A and 13B are graphs respectively showing finite-difference time-domain (FDTD) simulation results of the transmission characteristics of polarizer of FIG. 12, at cross polarization and parallel polarization.
Figure 13B:
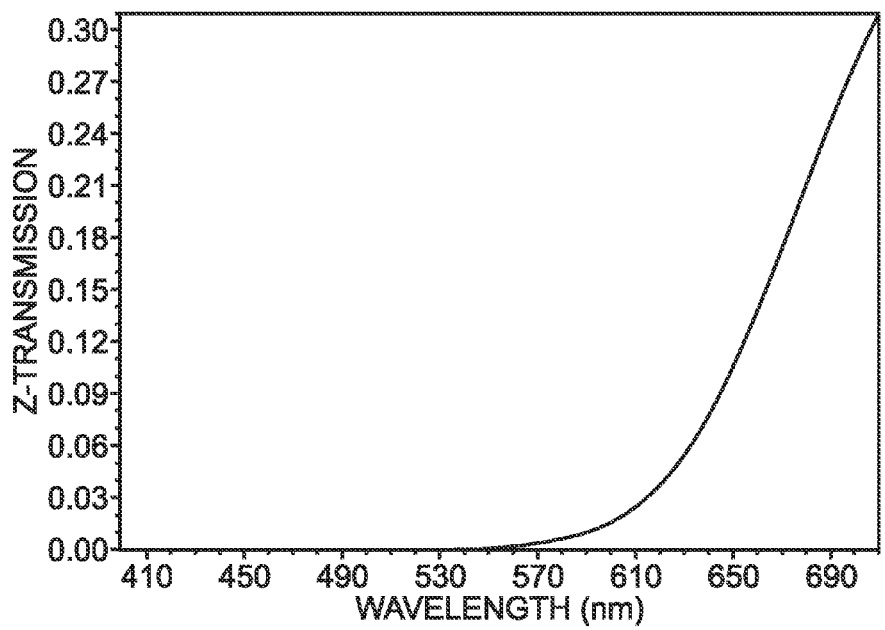

FIGS. 13A and 13B are graphs respectively showing finite-difference time-domain (FDTD) simulation results of the transmission characteristics of polarizer of FIG. 12, at cross polarization and parallel polarization. The polarizer is comprised of three-layer rectangular-shaped aluminum nanostructures embedded in a dielectric medium with refractive index of n=1.5 assembled on a glass substrate. The design parameter used in the simulation is as follow: $D_a$=80 nm, $D_b$=30 nm, t=30 nm, $SP_a$=30 nm, $SP_b$=70 nm, and $SP_L$=60 nm. As shown, good transmission characteristics are achieved in the blue wavelength spectrum. Specifically at the 450 nm wavelength, 87% transmission for cross polarization and 0.003% for parallel polarization results in extinction ratio of 29000. This extinction ratio is the highest value ever achieved for any type of polarizer of the prior art at this wavelength range. Moreover with a multiple stacked layer design, a high performance film polarizer can be achieved with a thickness of less than 1 μm. Conventional polarizers, such as glass polarizers, are bulky and heavy with a thickness in the order of 500 μm or larger. Since conventional polarizers are manufactured on a glass substrate, they have a low integration capability and incorporation of polarizer inside the display pixel assemblies is extremely difficult. Since the plasmonic film polarizer can be designed without the use of organic film, the reliability of operations in high thermal conditions is better, as compared to a conventional organic film polarizer.

A plasmonic film polarizer, by nature, is a light absorptive polarizer, so the light that is not transmitted is partially absorbed in the film. With the proper design of multiple stacked plasmonic film layers, greater than 50% of light can easily be absorbed by the polarizer. However, the in-cell polarizer described herein is not a reflective polarizer, such as a dual bright enhancement film (DBEF) or wire-grid polarizer, which reflects almost all the incident light in a parallel polarization. By simply changing the film that covers the nanostructures, the type of substrate refractive index material, or the aspect ratio of the nanostructures, surface plasmon resonances can be tuned to different wavelengths, making plasmonic polarizer operate in a broad spectral range.

Figure 14A:
FIGS. 14A through 14I depict steps in a process for manufacturing a plasmonic film polarizer.
Figure 14B:
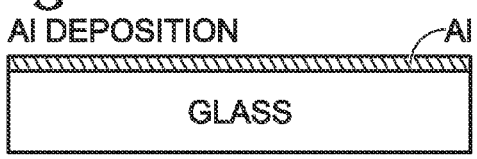
Figure 14C:
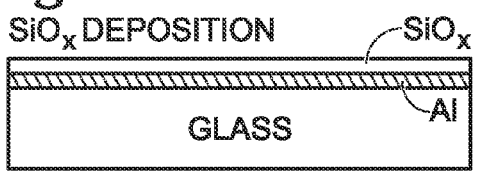
Figure 14D:
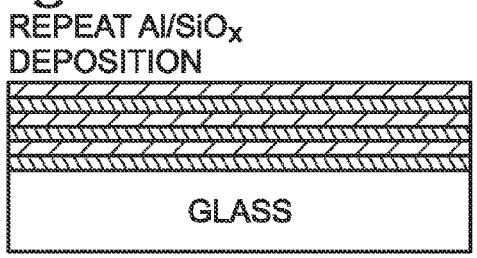
Figure 14E:
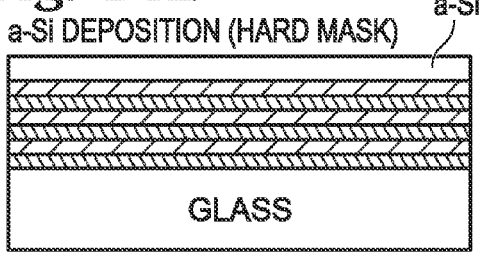
Figure 14F:
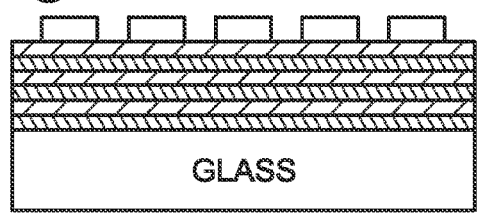
Figure 14G:
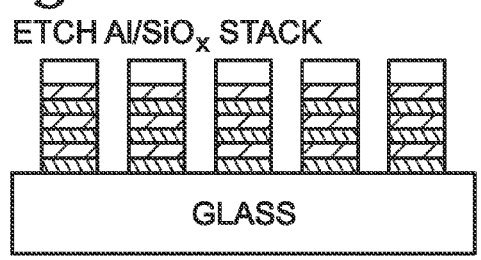
Figure 14H:
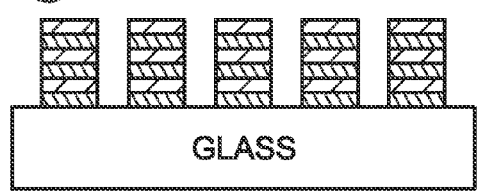
Figure 14I:
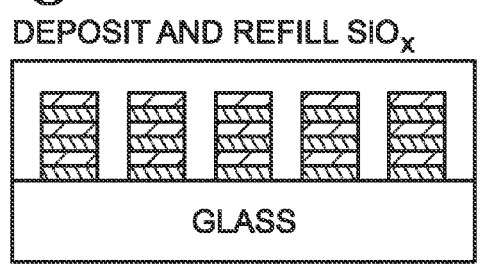

FIGS. 14A through 14I depict steps in a process for manufacturing a plasmonic film polarizer. A metal layer, such as Al is deposited on a transparent substrate in FIG. 14B. Al is deposited on a glass or quartz substrate using physical vapor deposition (PVD) system. Using a PVD system with different target sources, multiple stack layers can be deposited under vacuum conditions to avoid Al oxidation at the surfaces of each stack layer. For better adhesion of Al to glass substrate, a thin adhesion layer such as Ti or Cr can be added before each Al deposition. Next, a non-metallic film is deposited, such as silicon oxide for example (FIG. 14C). After multiple steps of metal/dielectric stacked layer deposition (FIG. 14D), a hard mask is deposited using PVD or chemical vapor deposition (CVD) system (FIG. 14E). For example, Si can be used as a hard mask for etching layers of metal and dielectric. The hard mask is then patterned with photoresist using different nanolithography techniques, such as nanoimprint, EUV, x-ray, or interference lithography (FIG. 14F). Using the patterned hard mask, the stacked layer nanostructures are formed using dry etching in a reactive ion etching (ME) system (FIG. 14G). After removing the hard mask (FIG. 14H), a dielectric material such as SiOx can be used to fill the spacing between stacks to make a plasmonic film polarizer (FIG. 14I).

FIG. 15 is a flowchart presented in association with the fabrication steps of FIGS. 14A through 14I. Step 1500 provides a transparent substrate. In Step 1502 a metal layer is deposited, and in Step 1504 a non-metallic layer is deposited. Alternatively but not shown, the order of Steps 1502 and 1504 may be reversed. Step 1506 represents the repetition of Steps 1502 and 504 so as to build a multiple layer stack of alternating metal and non-metal films. In Step 1508 a hard mask is formed, and in Step 1510 the hard mask is patterned. In Step 1512 the stack of alternating metal and non-metal films are etched through the hard mask, and in Step 1514 the hard mask is removed. In Step 1516 the spaces between the stacked layer pillar structures may be filled with a dielectric or organic material. In Step 1518 post-polarizer process steps are performed.

Figure 16:
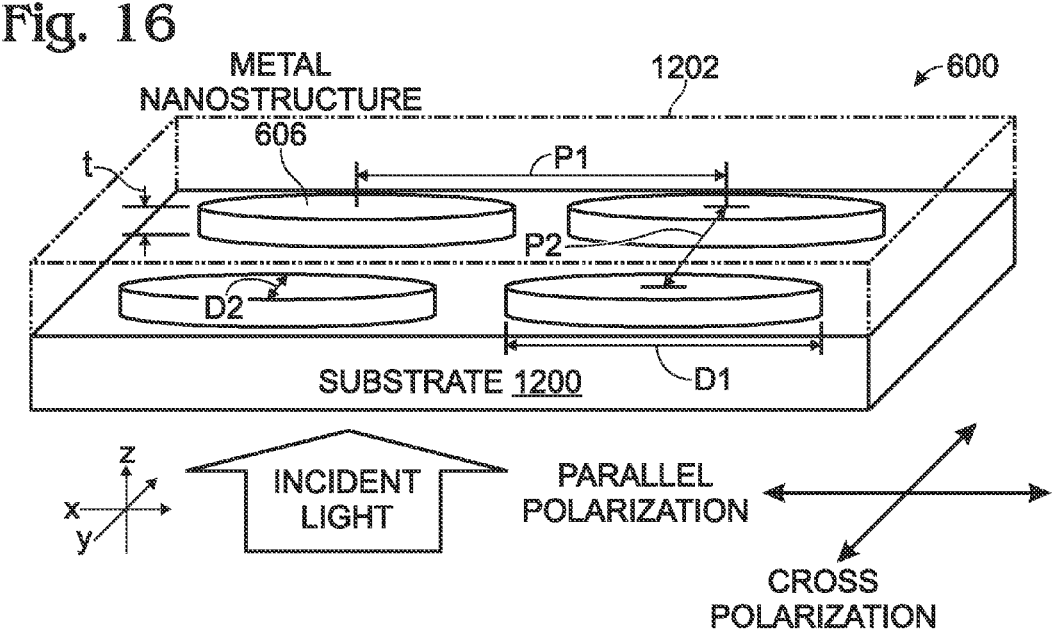
FIG. 16 is a perspective view of a plasmonic polarizer with elliptical-shaped metal nanostructures.

FIG. 16 is a perspective view of a plasmonic polarizer with elliptical-shaped metal nanostructures. Different metals can be used for the nanostructure 606, such as Ag, Al, and Au, depending on the wavelength range of interest for the polarizer. The nanostructures can be arranged in array configurations with predetermined pitch distances (P1, P2). D1 designates the diameter of long-axis, and D2 determines the short-axis diameter of ellipsoid. The nanostructures are embedded in a film with predefined refractive index, for example, a dielectric material with a refractive index in the range of 1.2 to 2. Incident light can intersect either the top of the film layer or the bottom of transparent substrate. Although only a single layer of nanostructures is shown for simplicity, the nanostructures can be stacked together in layers, with a specified layer gap spacing to create multiple layer structures.

FIG. 17 is a perspective view of a plasmonic polarizer with elliptical-shaped metal nanostructures arranged randomly in-plane and out-of-plane. In this aspect, the metal nanostructures 606 can be stacked randomly on top of each other with all the particles approximately of the same dimensions. In this case, the volume fill factor of nanostructures in the film can be used to design the film polarizer.

FIGS. 18A and 18B are flowcharts illustrating two different manufacturing methods to realize elliptical-shaped nanostructures, using the flowchart of FIG. 15 as a foundation. Steps 1500 through 1508 are the same as described above in the explanation of FIG. 15. After the hard mask deposition step in the process flow (Step 1508), nanolithography using a photomask or template such as nanoimprint lithography can be pursued to generate nanostructure molds with photoresist in Step 1800. For example, an extreme ultraviolet (EUV) process may be used. Typically for lithography using a photomask/template, it is very difficult to generate structures with rounded corners. Therefore for nanolithography using photomask/template, it is best to process the nanostructures as rectangular-shaped particles. Steps 1802 dry etches using the hard mask as a pattern and Step 1804 removes the hard mask. After the step of deposition and refilling with dielectric film (Step 1806), a thermal annealing process step can be added at an elevated temperature (Step 1808). This annealing step alters the shape of particles by rounding each corner of the nanostructures to generate elliptical or spherical nanoparticles. Details of this manufacturing method are described in a parent application entitled, METHOD FOR IMPROVING METALLIC NANOSTRUCTURE STABILITY, invented by Aki Hashimura et al., Ser. No. 13/434,548, filed on Mar. 29, 2012, which is incorporated herein by reference. The annealing process not only creates elliptical- or spherical-shaped nanoparticles with approximately the same diameter as pre-annealed particles, but also creates particles with much better environmental stability, as compared to as-deposited metal particles with amorphous crystal-like structures.

Alternatively, elliptical-shaped nanostructures can be achieved with another manufacturing method using nanolithography without the use of photomasks, such as interference lithography (Step 1812). Steps 1814 through 1820 dry etch the stacked layers, remove the hard mask, fill the spaces between stacked layer pillars, and continue on with post-polarizer processing steps. Using the method of Step 1812, no post-annealing process step is necessary, since a pattern with rounded corners can be generated directly onto the photoresist.

The competitive advantages of an in-cell plasmonic film polarizer can be summarized as follow: (1) high performances (extinction ratio and transmission) with tunable broadband wavelength operation including the blue and near UV wavelength range, (2) high integration capability into the display pixels, (3) better environmental stability due to the embedded plasmonic particles structure within a film, and (4) the realization of an ultra-thin polarizer with a thickness dependent only on the plasmonic film thickness, typically in the range of 0.5~1.0 μm.

FIG. 19 is a flowchart illustrating a method for fabricating a plasmonic polarizer. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. Generally however, the method follows the numeric order of the depicted steps. The method starts at Step 1900.

Step 1902 deposits alternating layers of non-metallic film and metal, forming a stack. Step 1904 forms a hard mask overlying the stack. The hard mask comprises structures having dimensions and periods between adjacent structures less than a first length, where the first length is equal to (a first wavelength of light/2). For example, the first wavelength of light may be 450 nm. Step 1906 etches the stack through openings in the hard mask to form pillar stacks of alternating non-metallic and metal layers having the dimensions of the hard mask structures. Step 1908 removes the hard mask structures. In one aspect, subsequent to removing the hard mask structures, Step 1910 fills spaces between the pillar stacks with a dielectric material. In one variation, Step 1901 forms a first antireflective coating (ARC) film underlying the pillar stacks. Step 1912 forms a second ARC film overlying the pillar stacks.

In one aspect, Step 1902 deposits non-metallic films having a thickness ($SP_L$) less than the first length, and metal films having a thickness (t) less than the first length. The thicknesses ($SP_L$) of the non-metallic film layers may be uniform or non-uniform. Likewise, the thicknesses (t) of the metal layers may be uniform or non-uniform. In a different aspect, Step 1902 deposits at least one non-metallic film layer comprising a first plurality of overlying non-metallic films made from a corresponding first plurality of non-metallic film materials. The non-metallic film layers may be comprised of a material transparent in a first range of light wavelengths or a material absorptive in the first range of light wavelengths. If a non-metallic film layer is comprised of a plurality of non-metallic film materials, then it is possible that it may be comprised of both transparent and absorptive materials.

In another aspect, Step 1904 forms a hard mask with structures all having common dimensions, or having uncommon dimensions. Further, Step 1904 forms periods between hard mask structures comprising a first space ($S_a$) in a first direction and a second space ($S_b$) in a second direction, orthogonal to the first direction. In one aspect, the first spaces are a first uniform value and the second spaces are a second uniform value. Alternatively, the first spaces have non-uniform values and the second spaces have non-uniform values. In addition, Step 1904 forms hard mask structures having a length ($D_a$) in a first direction and a width ($D_b$) in a second direction, orthogonal to the first direction, wherein $D_a$ is greater than $D_b$.

A plasmonic polarizer device and fabrication processes have been presented. Examples of particular materials and process steps have been presented to illustrate the invention. However, the invention is not limited to merely these examples. Other variations and embodiments of the invention will occur to those skilled in the art.

We claim:

1. A plasmonic polarizer comprising;
a three-dimensional (3D) array of metallic nanostructures comprising:
a plurality of plasmonic layers, where each layer includes a pattern of metallic nanostructures, the nanostructures having dimensions and periods between adjacent nanostructures less than a first length, where the first length is equal to (a first wavelength of light/2); and,
a plurality of non-metallic film layers, with at least one non-metallic film layer interposed between adjacent plasmonic layers.

2. The polarizer of claim 1 wherein vertically adjacent nanostructures, in adjacent plasmonic layers, form pillar structures, and wherein the vertically adjacent nanostructures in the pillar structures have a pitch ($SP_L$) less than the first length.

3. The polarizer of claim 2 wherein the pitch between the vertically adjacent nanostructures in the pillars is selected from a group consisting of uniform and non-uniform.

4. The polarizer of claim 1 wherein the nanostructures all have common dimensions.

5. The polarizer of claim 1 wherein the nanostructures in each plasmonic layer pattern have uncommon dimensions.

6. The polarizer of claim 1 wherein the periods between nanostructures in each plasmonic layer comprise a first space ($S_a$) in a first direction in a horizontal plane and a second space ($S_b$) in a second direction in the horizontal plane, orthogonal to the first direction, and wherein the first spaces are a first uniform value and the second spaces are a second uniform value.

7. The polarizer of claim 1 wherein the periods between nanostructures in each plasmonic layer comprise a first space ($S_a$) in a first direction in a horizontal plane and a second space ($S_b$) in a second direction in the horizontal plane, orthogonal to the first direction, and wherein the first spaces have non-uniform values and the second spaces have non-uniform values.

8. The polarizer of claim 1 wherein the nanostructures have a length ($D_a$) in a first direction in a horizontal plane, a width ($D_b$) in a second direction in the horizontal plane, orthogonal to the first direction, and a thickness (t) in a vertical plane orthogonal to the horizontal plane, wherein $D_a$ is greater than $D_b$, and wherein $D_a$ is greater than t.

9. The polarizer of claim 1 wherein the non-metallic film layer interposed between at least one set of adjacent plasmonic layers is a first plurality of overlying non-metallic films comprised of a corresponding first plurality of non-metallic film materials.

10. The polarizer of claim 1 further comprising:
a first antireflective coating (ARC) film underlying the 3D array of nanostructures; and,
a second ARC film overlying the 3D array of nanostructures.

11. The polarizer of claim 1 wherein each non-metallic film layer is comprised of a material selected from a group consisting of a material transparent in a first range of light wavelengths and a material absorptive in the first range of light wavelengths.

12. The polarizer of claim 1 wherein the 3D array of metallic nanostructures further comprises a dielectric material filling spaces in the 3D array of metallic nanostructures between pillars of vertically adjacent nanostructures.

13. The polarizer of claim 1 wherein the polarizer is an in-cell polarizer further comprising:
   a first transparent substrate overlying the 3D array of metallic nanostructures;
   a second transparent substrate underlying the 3D array of metallic nanostructures; and,
   a display control mechanism selected from a group consisting of a liquid crystal (LC) layer interposed between a transparent substrate and the 3D array of metallic nanostructures, a color filter interposed between a transparent substrate and the 3D array of metallic nanostructures, and both the color filter and LC layer interposed between transparent substrates and the 3D array of metallic nanostructures.

14. A method for fabricating a plasmonic polarizer, the method comprising;
   depositing alternating layers of non-metallic film and metal, forming a stack;
   forming a hard mask overlying the stack, the hard mask comprising structures having dimensions and periods between adjacent structures less than a first length, where the first length is equal to (a first wavelength of light/2);
   etching the stack through openings in the hard mask to form pillar stacks of alternating non-metallic film and metal layers having the dimensions of the hard mask structures; and,
   removing the hard mask structures.

15. The method of claim 14 further comprising:
   subsequent to removing the hard mask structures, filling spaces between the pillar stacks with a dielectric material.

16. The method of claim 14 wherein depositing alternating layers of non-metallic film and metal includes depositing non-metallic films each having a thickness ($SP_L$) less than the first length, and metal films each having a thickness (t) less than the first length.

17. The method of claim 14 wherein depositing alternating layers of non-metallic film and metal includes depositing non-metallic films with each with a thickness ($SP_L$) selected from a group consisting of uniform and non-uniform, and metal films each with a thickness (t) selected from the group consisting of uniform and non-uniform.

18. The method of claim 14 wherein forming the hard mask includes forming hard mask structures all having common dimensions.

19. The method of claim 14 wherein forming the hard mask includes forming hard mask structures having uncommon dimensions.

20. The method of claim 14 wherein forming the hard mask includes forming periods between hard mask structures comprising a first space ($S_a$) in a first direction and a second space ($S_b$) in a second direction, orthogonal to the first direction, and wherein the first spaces are a first uniform value and the second spaces are a second uniform value.

21. The method of claim 14 wherein forming the hard mask includes forming periods between hard mask structures comprising a first space ($S_a$) in a first direction and a second space ($S_b$) in a second direction, orthogonal to the first direction, and wherein the first spaces have non-uniform values and the second spaces have non-uniform values.

22. The method of claim 14 wherein forming the hard mask includes forming hard mask structures having a length ($D_a$) in a first direction and a width ($D_b$) in a second direction, orthogonal to the first direction, wherein $D_a$ is greater than $D_b$.

23. The method of claim 14 wherein depositing alternating layers of non-metallic film and metal includes depositing at least one non-metallic film layer comprising a first plurality of overlying non-metallic films made from a corresponding first plurality of non-metallic film materials.

24. The method of claim 14 further comprising:
   forming a first antireflective coating (ARC) film underlying the pillar stacks; and,
   forming a second ARC film overlying the pillar stacks.

25. The method of claim 14 wherein depositing alternating layers of non-metallic film and metal includes depositing non-metallic film layers comprised of a material selected from a group consisting of a material transparent in a first range of light wavelengths and a material absorptive in the first range of light wavelengths.

26. A display with a plasmonic in-cell polarizer comprising;
   a waveguide having a horizontal top surface to supply visible spectrum light in a vertical direction, orthogonal to the horizontal top surface;
   a transparent bottom substrate overlying the waveguide;
   a plasmonic in-cell polarizer overlying the waveguide top surface,
   the polarizer comprising:
      a three-dimensional (3D) array of metallic nanostructures overlying the bottom substrate, the 3D array of metallic nanostructures comprising:
         a plurality of plasmonic layers, where each layer includes a pattern of metallic nanostructures, the nanostructures having dimensions and periods between adjacent nanostructures; and,
         a plurality of non-metallic film layers, with at least one non-metallic film layer interposed between adjacent plasmonic layers;
   the display further comprising:
   a transparent top substrate overlying the 3D array of metallic nanostructures; and,
   a color filter interposed between the top substrate and the 3D array of metallic nanostructures.

27. The display of claim 26 wherein the color filter is a phosphor color filter; and,
   wherein the waveguide supplies light at a wavelength of about 450 nanometers.

28. The display of claim 26 further comprising:
   a liquid crystal (LC) layer interposed between the bottom substrate and the polarizer;
   wherein the bottom substrate is an active matrix of thin-film transistors (TFTs).

* * * * *